United States Patent
Broberg et al.

(10) Patent No.: US 9,221,182 B2
(45) Date of Patent: Dec. 29, 2015

(54) INDUSTRIAL ROBOT WITH PRESSURIZED AIR SUPPLY IN BALANCING DEVICE

(75) Inventors: Arne Broberg, Västerås (SE); Roland Erkki, Västerås (SE)

(73) Assignee: ABB AB, Västerås (SE)

( * ) Notice: Subject to any disclaimer, the term of this patent is extended or adjusted under 35 U.S.C. 154(b) by 1692 days.

(21) Appl. No.: 12/443,373

(22) PCT Filed: Sep. 25, 2007

(86) PCT No.: PCT/EP2007/060147
§ 371 (c)(1),
(2), (4) Date: Mar. 27, 2009

(87) PCT Pub. No.: WO2008/037702
PCT Pub. Date: Apr. 3, 2008

(65) Prior Publication Data
US 2010/0043587 A1   Feb. 25, 2010

(30) Foreign Application Priority Data
Sep. 27, 2006   (EP) ..................................... 06121306

(51) Int. Cl.
*B25J 17/00*   (2006.01)
*B25J 19/00*   (2006.01)

(52) U.S. Cl.
CPC .......... *B25J 19/0016* (2013.01); *B25J 19/0079* (2013.01); *Y10T 74/20305* (2015.01)

(58) Field of Classification Search
USPC ........................................ 74/490.01; 901/48
See application file for complete search history.

(56) References Cited

U.S. PATENT DOCUMENTS

| 4,229,136 A | * | 10/1980 | Panissidi | 414/673 |
| 4,297,908 A | * | 11/1981 | Zimmer | 74/469 |
| 4,904,150 A | * | 2/1990 | Svensson et al. | 414/719 |
| 5,305,652 A | | 4/1994 | Zimmer | |
| 5,415,057 A | * | 5/1995 | Nihei et al. | 74/490.01 |
| 6,408,225 B1 | * | 6/2002 | Ortmeier et al. | 700/254 |
| 6,848,333 B2 | | 2/2005 | Lundstrom et al. | |
| 2004/0093975 A1 | | 5/2004 | Amparore et al. | |

FOREIGN PATENT DOCUMENTS

| JP | 02083192 A | | 3/1990 | |
| JP | 04372383 A | | 12/1992 | |
| JP | 06031680 A | * | 2/1994 | ............... B25J 19/06 |
| JP | 09085674 A | | 3/1997 | |
| JP | 2005319550 A | | 11/2005 | |

OTHER PUBLICATIONS

PCT/ISA/210—International Search Report—Nov. 13, 2007.
PCT/ISA/237—Written Opinion of the International Search Authority—Nov. 13, 2007.

* cited by examiner

*Primary Examiner* — Vicky Johnson
(74) *Attorney, Agent, or Firm* — Venable LLP; Eric J. Franklin

(57) ABSTRACT

An industrial robot including a first robot part and a second robot part arranged to be moved in relation to each other. A balancing device is arranged between the first robot part and the second robot part. The balancing device is arranged to counteract a gravitational force upon relative movement of the robot parts. The balancing device includes a mechanical spring and a spring housing arranged enclosing the spring. The spring housing includes at least one air inlet adapted for pressurized air supply.

5 Claims, 4 Drawing Sheets

INDUSTRIAL ROBOT WITH PRESSURIZED AIR SUPPLY IN BALANCING DEVICE

CROSS-REFERENCE TO RELATED APPLICATIONS

This application claims priority to European patent application 06121306.2 filed 27 Sep. 2006 and is the national phase under 35 U.S.C. §371 of PCT/EP2007/060147 filed 25 Sep. 2007.

TECHNICAL FIELD

The present invention relates to an industrial robot comprising a balancing device with a mechanical spring means.

BACKGROUND OF THE INVENTION

Industrial robots usually comprise a robot foot, a stand and a robot arm. The stand is rotatably arranged on the robot foot. The robot arm is rotatably arranged in a joint on the stand. A six axis industrial robot, for example, comprises a first robot arm, a second robot arm, a wrist arranged with a tool holder and drive means comprising an electrical motor and a reduction gear rotation of each axis.

In its initial position, which may also be a rest position, the robot is oriented with the first arm approximately vertical. When the robot is moving/operating, the first arm is rotated in relation to the stand while at the same time the first and second arm rotate in relation to each other. The total moving mass consists of the handling weight applied to the wrist as well as the actual dead weight of the robot. Upon movement of the robot, the drive means concerned rotates the robot arms from the rest position/initial position as defined above, whereby the gravitational force acting on the arms generates a torque.

The expression rotation from a rest position/initial position in this context means a rotation in a direction where the gravitational force contributes to the rotation of a robot arm. This rotation is called balancing in the following. A balancing device is a device so constructed that, during the rotation from the rest position, it generates a torque, which acts to return the robot to its rest position/initial position. Thus, a balancing device assists/relieves the activated drive motor/motors during the lifting/rotation back.

The expression rotation back to the rest position/initial position thus means a rotation that counteracts and hence compensates for the gravitational force.

A commonly used balancing device comprises a balancing cylinder, a piston, elastic spring means and a pull rod. During operation of a robot comprising a balancing cylinder, the pull rod is arranged to move out or in of the cylinder to compress or release the spring unit arranged within the cylinder. Thereby energy is stored within or is released from the spring unit.

A balancing cylinder, as mentioned above, comprises a cavity inside the cylinder. This cavity is filled with grease and air. The cylinder has at least one opening, that is where the pull rod is moving in and out and this opening is sealed. If there is another opening in the cylinder for some reason, it is also sealed.

The pull rod of an unloaded balancing cylinder occupies a small volume inside the cylinder. Every time the rod is moved out during operation, a vacuum will arise inside the cylinder. If a robot is operating in an environment with high humidity, there is a risk that moisture is sucked in through any sealing due to this vacuum.

The same problem arises when a robot is working in an application where there is a hundred percentage of humidity. Then, there is a risk that liquid on sealing surfaces is sucked in due to this vacuum.

During operation of an industrial robot, the temperature is increasing within the robot. Additionally, the environment can be warm and humid. An increasing temperature during operation of a robot causes air within a balancing cylinder to expand its volume. Finally, when the robot is shut down, the temperature is dropping, which causes the internal air volume of the balancing cylinder to be reduced and a vacuum will arise. When this occurs in a balancing cylinder comprising a worn sealing, there is even a risk that liquid is pouring into the cylinder.

It is most important to avoid moist or liquid inside the cylinder of a balancing device since it causes corrosion of the complete balancing cylinder. Corrosion within a balancing cylinder results in malfunction, which causes a negative impact on the life time of a spring balancing device.

JP9085674 teaches to cool down a drive motor for an articulated robot without installing a cooling fan by providing a balancer having air holes opened thereto on its both sides and connecting the air holes to a blast pipe opened toward side faces of the drive motor. A piston 43 compresses a compression spring 42 and at the same time exhausts the air between the piston 43 and the top part 412 of a cylinder 41 to the side face of a drive motor 21 via an air hole 46 and a blast pipe 48 so as to cool down the drive motor 21 (FIG. 6).

JP04372383 teaches an industrial robot comprising a robot arm and a balance device with a piston-cylinder mechanism comprising a spring means. The cylinder housing comprises an air inlet through which pressurized air is supplied to the spring housing. The robot arm is balanced with a total sum of air pressure power and spring power in the entire region where it can be rotated.

Thus, there are needs to increase the life time of a spring balancing unit comprised in an industrial robot working in environments with high humidity.

These needs cannot be fulfilled by the balancing systems according to the above-mentioned prior art.

SUMMARY OF THE INVENTION

It is an object of the invention is to improve the usability of industrial robots in environments with high humidity. The problem to be solved is to eliminate the risk of corrosion especially within a spring balancing unit comprised in the robot.

According to an aspect of the present invention, there is provided an industrial robot comprising a first robot arm and a second robot arm arranged to be moved in relation to each other and a balancing device arranged there between. The balancing device is arranged to counteract the gravitational force upon relative movement of the robot arms. The balancing device comprises a mechanical spring means and a spring housing enclosing the spring means wherein the spring housing comprises at least one air inlet connected to pressurized air supply means such that the spring housing is filled with pressurized air.

During operation of the robot, a pressurised air supply will fill the empty space in the spring housing with pressurized air and hinder any moisture or liquid/water to enter anywhere into the inner of a balancing cylinder through e.g. a sealed opening for a pull rod, as mentioned above. Therefore, the industrial robot is suitable for environments with high humidity and varying temperature. Although, a small vacuum is created during falling/decreasing temperature, no moisture or water is sucked into the spring housing of the balancing device.

Even during periods of robot operation stop, a pressurised air supply will fill the spring housing with pressurized air and hinder moisture or liquid/water to enter anywhere into a balancing cylinder.

The industrial robot is suitable for environments with high humidity, since it can be shut off and stand to cool down, for the same reason as mentioned above.

Due to the pressurized air supply, a sealing e.g. around the pull rod mentioned above can be of a simple and cheap kind. Further, the air supply is an extra safety arrangement when said sealing around a pull rod as mentioned above is exposed to unintentional wear and the seal function becomes impaired.

In one embodiment, an outlet valve is arranged in the spring housing. Then, the internal air pressure in the balancing device can be preset to a selected value.

In one embodiment, a first air hose is arranged connected to a balancing device and a second air hose is arranged connected to a drive device for simultaneous air supply into both the balancing device and the drive device. Although a small vacuum is created during falling/decreasing temperature, no moisture or water is sucked into the balancing device or the drive device due to the pressurized air supply.

In one embodiment, a first air hose is attached to the spring housing with an outlet valve as defined above. An additional air hose is arranged connected between the outlet valve and a drive device. Pressurized air leaving the balancing device through an outlet valve is supplied to a drive device for preventing moisture or water to be sucked into the balancing device and the drive device due to a created vacuum during a temperature drop.

The air hoses are either separate hoses or one hose arranged branched off into several air supply hoses.

The feature "air" is defined to comprise air or clean air. The air is considered to alternatively be enriched with oil. The invention is suitable for e.g. water jet cleaning.

The feature "air supply" is defined as a continuous flow of air or alternatively an intermittent flow of air and also flow of air during periods when an actual robot is not operating.

According to one embodiment, the air temperature can be regulated.

According to a second aspect of the invention there is provided a method for an industrial robot with a balancing device comprising a mechanical spring means and a spring housing enclosing the spring means. The method comprises supplying pressurized air into the spring housing to prevent moisture or liquid to be sucked into the housing due to vacuum.

In one embodiment, the method comprises keeping the internal air pressure in the housing constant.

In one embodiment, the method comprises supplying pressurized air both into the spring housing and into at least one first drive unit. The aim of the embodiment is to prevent moister or liquid to be sucked into both the balancing device and the drive unit due to a created vacuum during a temperature drop.

In one embodiment, the method comprises supplying the pressurized air, leaving the spring housing through an outlet valve, from the spring housing into at least one second drive unit.

BRIEF DESCRIPTION OF THE DRAWING

The invention will be explained more closely by the description of different embodiments thereof and with reference to the appended drawing in which.

DESCRIPTION OF ALTERNATIVE EMBODIMENTS

Figure 1:
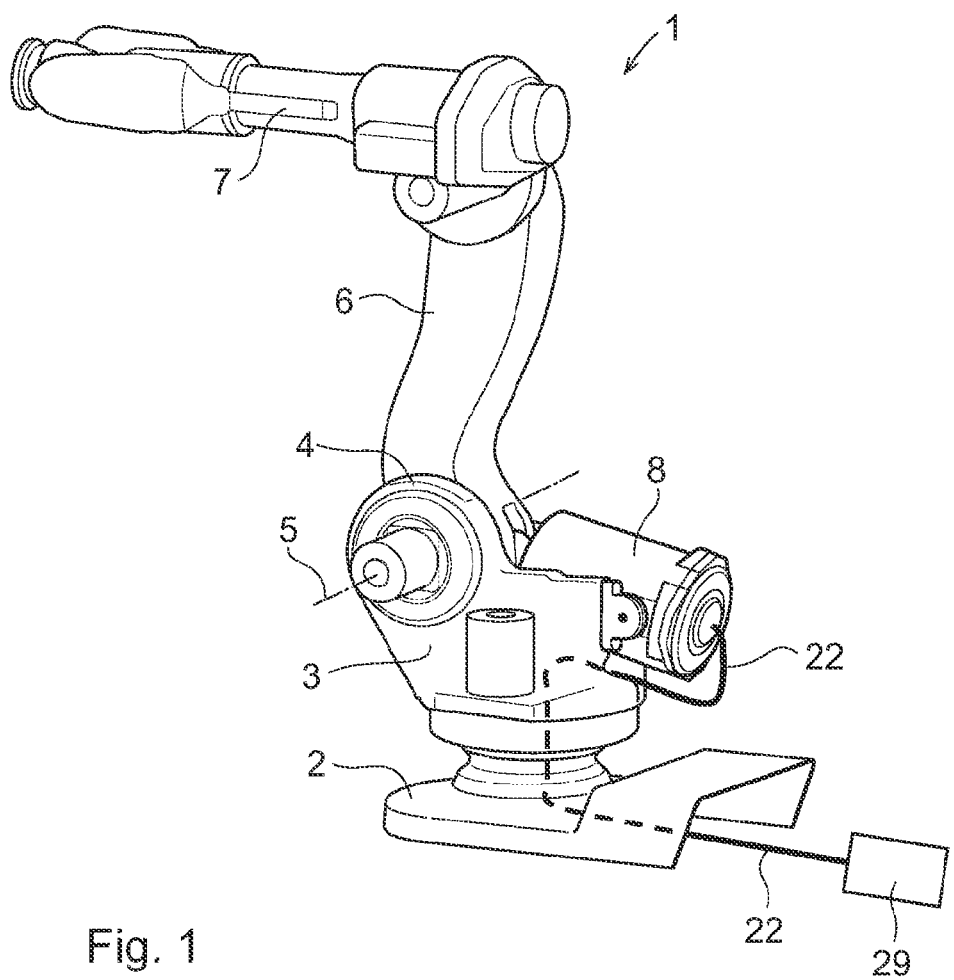
FIG. 1 is an industrial robot comprising a balancing unit according to the invention.

An industrial robot 1 (FIG. 1) comprises a robot foot 2, a stand 3 arranged pivoting on the robot foot 2 and a first robot arm 6 is connected to a joint 4 on the stand 3. The first robot arm 6 is pivoted around a horizontal axis 5 of rotation in the joint 4 and supports a second robot arm 7. The first 6 and the second arm 7 are arranged for relative movement during operation of the robot. The robot further comprises a balancing device 8 connected to pressurized air supply means 29 and this will be described in detail below.

Figure 3:
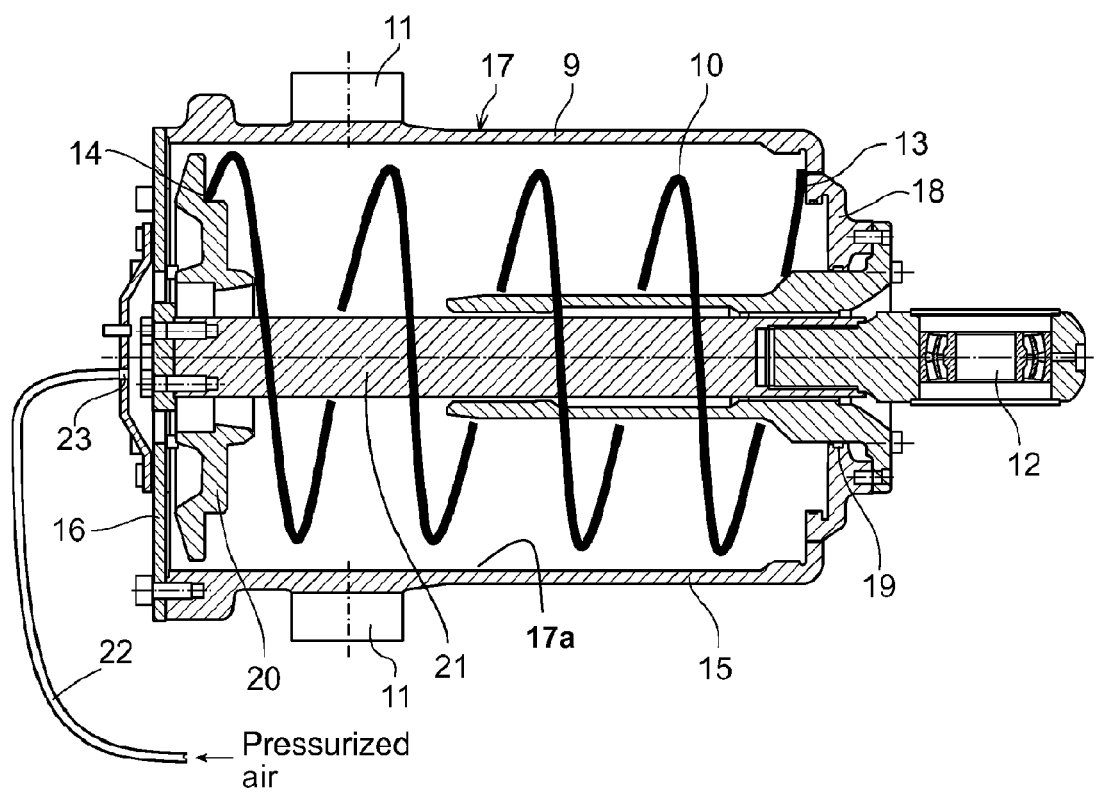
FIG. 3 is a balancing unit according to the invention in cross section.

A balancing device 8 is mounted on the robot 1 (FIG. 3) and comprises a balancing cylinder 9, a piston 20, elastic spring means 10 and a pull rod 21. The cylinder 9 comprises a cylindrical body 17 mounted oscillating about an axis perpendicular to the axis of the cylinder. The piston 20 is mounted and adapted to slide in the cylindrical body 17 and is recalled towards an end position by the elastic spring means 10 arranged inside the cylinder. The pull rod 21 is connected to the piston 20 and is arranged coming out of the cylinder. Said pull rod 21 having its free 12 end connected in an articulated way to the oscillating robot arm in an area set at a distance from the axis of oscillation of the said robot arm.

The balancing cylinder 9 comprises a first spring seat 13 and a second spring seat 14 between which the helical spring unit 10 is arranged. The first spring seat 13 comprises a spring housing 15, which is arranged with a first end 16, a cylindrical envelope surface 17a and also a second end 18, provided with an opening 19. The second spring seat 14 comprises a piston 20, which is rigidly arranged at one end of a pull rod 21. The pull rod 21 is together with the piston 20 displaceably arranged inside the spring housing 15.

The balancing cylinder 9 comprises at least one first attachment 11 for pivoted mounting on the stand 3 and a second attachment 12 for pivoted mounting on the first arm part 6.

When the pull rod 21 is pulled out of the spring housing 15 the helical spring 10 is compressed and thereby generates a spring force, which strives to extend the and thus retract the pull rod 21 back into the spring housing 15. The generated spring force is used for the balancing.

A first air hose 22 for pressurized air supply is connected between an air supply means 29 and the first end 16 of the spring housing 15 in an air inlet 23.

Figure 2:
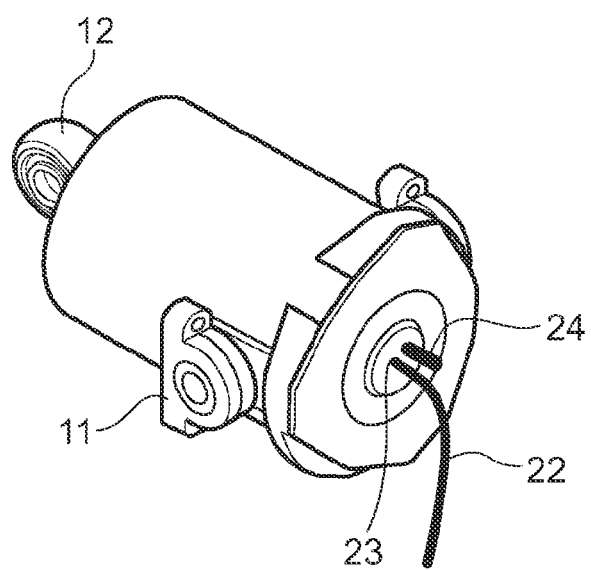
FIG. 2 is a balancing unit according to the invention.

FIG. 2 is a spring balancing device 8 comprising a first air hose 22, for pressurized air supply, attached to the balancing device 8 in an air inlet 23. An outlet valve 24 is arranged for pressurized air leaving the balancing device.

Figure 4:
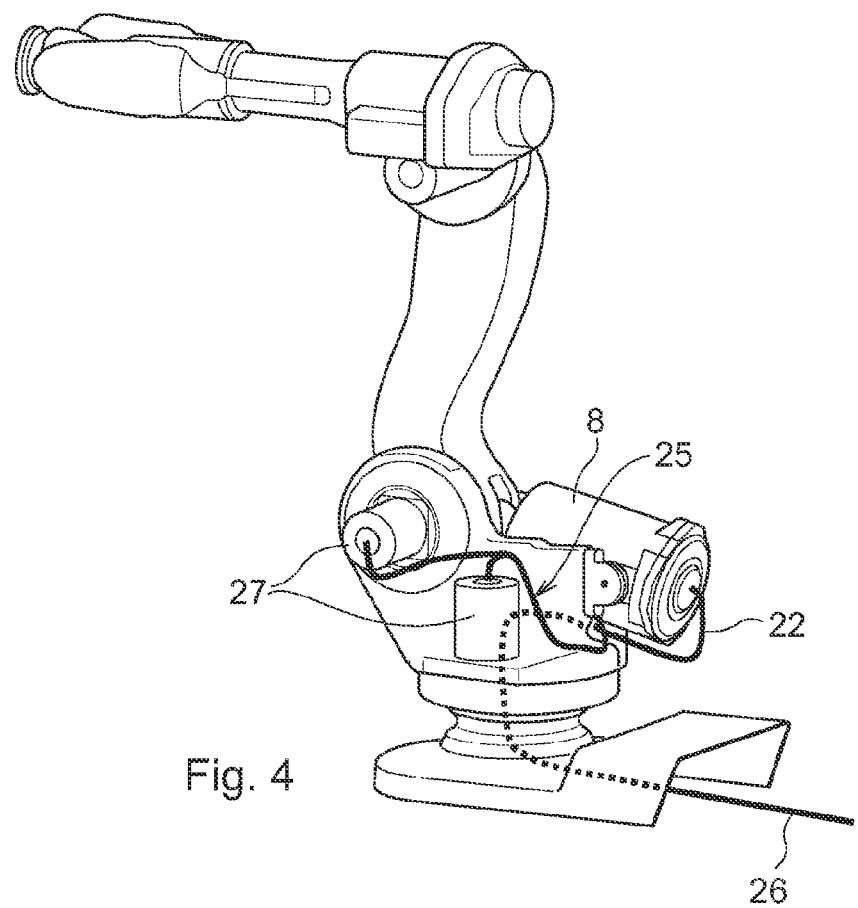
FIG. 4 is an industrial robot according to an embodiment of the invention with a second air hose.

FIG. 4 is a robot comprising a first air 22 hose for pressurized air supply to a balancing device 8 and a second air hose 25 for pressurized air supply to two drive units 27 comprised in the robot. In this embodiment a common air hose 26 is branched off into the first 22 and the second air hose 25.

Figure 5:
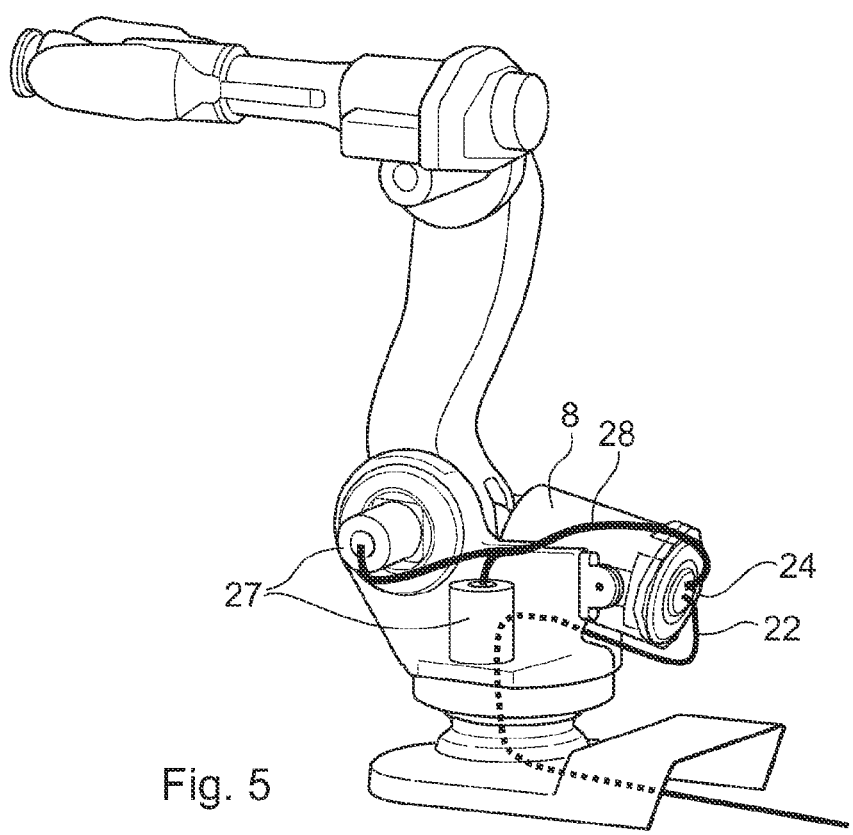
FIG. 5 is an industrial robot according to an embodiment of the invention with a third air hose.
Figure 6:
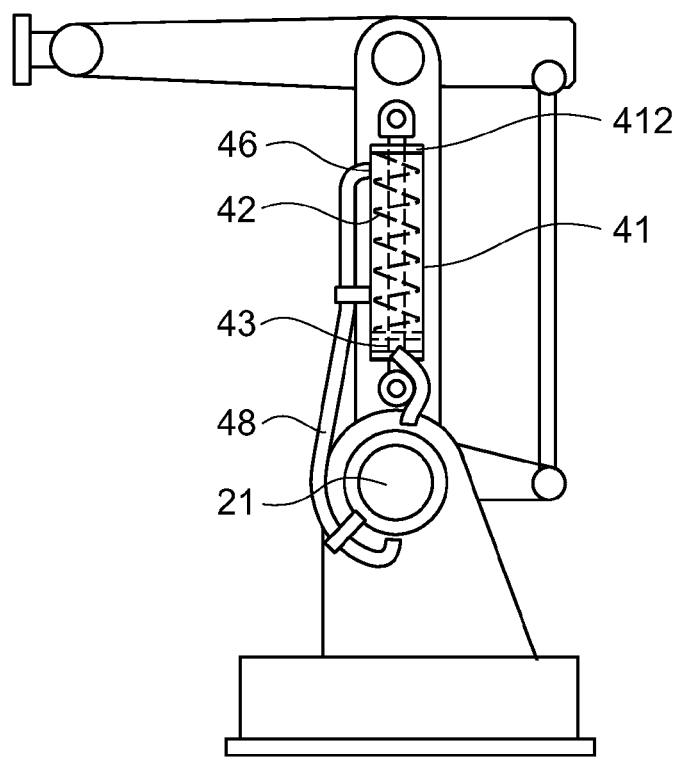
FIG. 6 is an industrial robot according to prior art.

FIG. 5 is a robot comprising a third air hose 28 for pressurized air supply from an outlet valve 24 of a balancing cylinder 9 to two drive units 27 comprised in the robot. Thus, the third air hose 28 is arranged connected for supplying pressurized air leaving the balancing cylinder 8 and is branched off into two air hoses, each connected to a drive unit 27.

The invention claimed is:

1. An industrial robot, comprising:
   a first robot part and a second robot part arranged to be moved in relation to each other, and
   a balancing device arranged between the first robot part and the second robot part, wherein the balancing device is arranged to counteract a gravitational force upon relative movement of the robot parts, said balancing device comprising a balancing cylinder comprising a mechanical spring and a spring housing arranged enclosing the spring, wherein the spring housing comprises at least one air inlet adapted for connection to a pressurized air supply, and wherein the balancing cylinder is configured for the spring housing to be completely filled with pressurized air through the at least one air inlet.

2. The industrial robot according to claim 1, wherein a first air hose for supplying pressurized air is connected between the pressurized air supply and the at least one air inlet.

3. The industrial robot according to claim 2, wherein a second air hose is arranged connected to at least one first drive unit for pressurized air supply into the at least one drive unit.

4. The industrial robot according to claim 1, wherein an outlet valve is arranged in the spring housing.

5. The industrial robot according to claim 4, wherein a third air hose is arranged connected for air supply between the outlet valve and at least one second drive unit.

* * * * *